US009288173B2

(12) United States Patent
Vitaldevara et al.

(10) Patent No.: US 9,288,173 B2
(45) Date of Patent: Mar. 15, 2016

(54) GEO-DATA SPAM FILTER

(71) Applicant: Microsoft Technology Licensing, LLC, Redmond, WA (US)

(72) Inventors: Krishna Vitaldevara, Fremont, CA (US); Eliot C. Gillum, Mountain View, CA (US); Jason D. Walter, San Jose, CA (US); Kevin H. Lau, San Jose, CA (US); Geoffrey John Hulten, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/109,394

(22) Filed: Dec. 17, 2013

(65) Prior Publication Data
US 2014/0108578 A1 Apr. 17, 2014

Related U.S. Application Data

(63) Continuation of application No. 13/084,132, filed on Apr. 11, 2011, now Pat. No. 8,626,856.

(51) Int. Cl.
*H04L 12/58* (2006.01)
(52) U.S. Cl.
CPC ..................................... *H04L 51/12* (2013.01)
(58) Field of Classification Search
CPC .... H04L 51/12; H04L 12/585; H04L 63/0236
See application file for complete search history.

(56) References Cited

U.S. PATENT DOCUMENTS

| | | | |
|---|---|---|---|
| 7,272,853 B2 | 9/2007 | Goodman et al. | |
| 7,366,919 B1* | 4/2008 | Sobel et al. | ..................... 726/23 |
| 7,519,668 B2 | 4/2009 | Goodman et al. | |
| 7,647,321 B2 | 1/2010 | Lund et al. | |
| 7,835,294 B2 | 11/2010 | Shuster | |
| 8,145,710 B2 | 3/2012 | Cowings et al. | |
| 8,626,856 B2 | 1/2014 | Vitaldevara et al. | |
| 2005/0076240 A1 | 4/2005 | Appleman | |
| 2005/0223076 A1 | 10/2005 | Barrus et al. | |
| 2005/0240617 A1* | 10/2005 | Lund et al. | ................... 707/102 |
| 2006/0031373 A1 | 2/2006 | Werner et al. | |
| 2006/0047769 A1 | 3/2006 | Davis et al. | |

(Continued)

OTHER PUBLICATIONS

"How do I find a geographical location from an IP Address", Retrieved from: <http://www.analysespider.com/ip2location/ip_location_finder.html> on Jan. 31, 2011, 2 pages.

(Continued)

*Primary Examiner* — Joe Chacko
(74) *Attorney, Agent, or Firm* — Julie Kane Akhter; Danielle Johnston-Holmes; Micky Minhas

(57) ABSTRACT

Geo-data spam filters are described. In one or more implementations, origin data and language data of a message are evaluated to establish a score for the message indicating a likelihood that the message is spam. The evaluation includes comparing the origin data and the language data to ranked lists indicating message origins and languages with which a respective message recipient interacts positively and ranked lists indicating message origins and languages with which the respective recipient interacts negatively. Interactions of the respective recipient with previously sent messages may be tracked to form these lists. Based on the score established by evaluating the origin data and the language data of the message, the message is filtered for delivery.

20 Claims, 4 Drawing Sheets

(56) References Cited

U.S. PATENT DOCUMENTS

| | | | |
|---|---|---|---|
| 2006/0095524 A1* | 5/2006 | Kay et al. | 709/206 |
| 2006/0253537 A1* | 11/2006 | Thomas | 709/206 |
| 2008/0320497 A1 | 12/2008 | Tarkoma et al. | |
| 2009/0055412 A1* | 2/2009 | Cooley | 707/100 |
| 2010/0153394 A1 | 6/2010 | Wood | |
| 2010/0251362 A1* | 9/2010 | Gillum et al. | 726/22 |
| 2012/0259929 A1 | 10/2012 | Vitaldevara | |
| 2012/0265834 A1 | 10/2012 | Davis et al. | |

OTHER PUBLICATIONS

"Location Based Spam", Retrieved from: <http://www.tao-of-email.com/tad/location-based-spam/> on Jan. 31, 2011, (Mar. 31, 2009), 3 pages.

"Non-Final Office Action", U.S. Appl. No. 13/084,132, (Feb. 25, 2013),10 pages.

"Notice of Allowance", U.S. Appl. No. 13/084,132, (Sep. 3, 2013),14 pages.

"Spam Filtering with Port Forwarding and Geo-Location", Retrieved from: <http://wiki.mikrotik.com/wiki/Spam_Filtering_with_Port_Forwarding_and_Geo-Location> on Jan. 31, 2011, (Feb. 26, 2010), 3 pages.

Blackmelvyn, Tiger "Language-based Comment Spam Condom (Scripts) 1.0", Retrieved from: <http://www.downloadplex.com/Scripts/PHP/Modules/landuage-based- omment-spam-condom-scripts 298047.html> on Jan. 31, 2011, (Oct. 17, 2010), 5 pages.

Edwards, Christer, "Filter Spam by Language in Gmail", Retrieved from: <http://ubuntu-totorials.com/2009/05/13/filter-spam-by-language-in-gmail/> on Jan. 31, 2011, (May 13, 2009), 5 pages.

\* cited by examiner

… (1)

GEO-DATA SPAM FILTER

RELATED APPLICATION

This application is a continuation of and claims priority to U.S. patent application Ser. No. 13/084,132 filed Apr. 11, 2011 entitled "Geo-Data Spam Filter", the disclosure of which is incorporated by reference herein in its entirety.

BACKGROUND

A typical user's interaction with messages received over a network is ever increasing. For example, the user may send and receive hundreds of emails and text messages in a given day. These messages may provide a wide variety of functionality. However, as the functionality that is available to the user has continued to increase, so too have the malicious uses of this functionality.

One such example is unsolicited commercial messages, otherwise known as "spam". Spam is typically thought of as a message that is sent to a large number of recipients, such as to promote a product or service. Because sending such messages generally costs the sender little or nothing, "spammers" have developed techniques which send the equivalent of junk mail to as many users as can be located. Even though a minute fraction of the recipients may actually desire the described product or service, this minute fraction may be enough to offset the minimal costs in sending the spam. Consequently, spammers are responsible for communicating a vast number of unwanted and irrelevant messages which may hinder a user's interaction with messages of interest.

SUMMARY

Geo-data spam filters are described. In one or more implementations, origin and language data of a message are evaluated to establish a score for the message indicating a likelihood that the message is spam. The evaluation includes comparing the origin data and the language data of the messages to ranked lists of message origins and languages, which may be formed, for example, by tracking interactions of the respective recipient with messages that were previously delivered to the respective recipient. Based on the score established by evaluating the origin data and language data of the message, the message is then filtered for delivery.

In one or more implementations, interactions of multiple message recipients with multiple messages are tracked to form aggregated ranked lists of message origins and languages with which the multiple recipients interact positively and aggregated ranked lists of message origins and languages with which the multiple recipients interact negatively. Similarly, interactions of multiple respective recipients with a single message may be tracked. A score for the message may indicate that the message is likely to be spam, for example, if a determination is made that the multiple respective recipients interact negatively with the message. Further communications of the message can then be stopped when a score of the message indicates that it is likely to be spam.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The prevalence of user interactions with messages received over a network is ever increasing. A large part of this increase involves unsolicited messages that the user may consider irrelevant. Consequently, filtering incoming messages may be used to reduce the number of unsolicited messages that are communicated to the user, thereby promoting efficient user interaction with messages that are likely to be of interest to the user.

Geo-data spam filters are described. In one or more implementations, messages may be filtered (e.g. not delivered to a recipient) based on data that describes an origin of the message and/or languages that correspond to the message. For example, an origin IP address of a message may correspond to a country with which the user typically does not interact. In another example, the origin IP address of the message may correspond to a country with which the user typically interacts. Messages to a particular recipient, therefore, may be filtered based on this distinction by delivering messages originating from countries with which a user typically interacts and not delivering messages from countries with which the user does not interact (or interacts negatively).

In yet another example, a user may be familiar with at most a few languages and, therefore, typically interacts with messages written in those languages. Still further, a user typically may not interact with (or interact negatively with) messages written in languages with which the user is not familiar. Thus, messages to a particular recipient may also be filtered by delivering messages in languages with which the user is familiar and not delivering messages in languages with which the user is not familiar.

Ranked lists of message origins and/or languages can also be used by a message filtering service to filter incoming messages. For example, interactions of a user with previously delivered messages can indicate message origins and/or languages with which the user interacts positively (or negatively). The message filtering service, therefore, may form ranked lists of message origins and/or languages by tracking interactions of a user with previously delivered messages. Thus, an incoming message may be filtered for delivery by comparing the origin data and language data of the message to the ranked lists.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
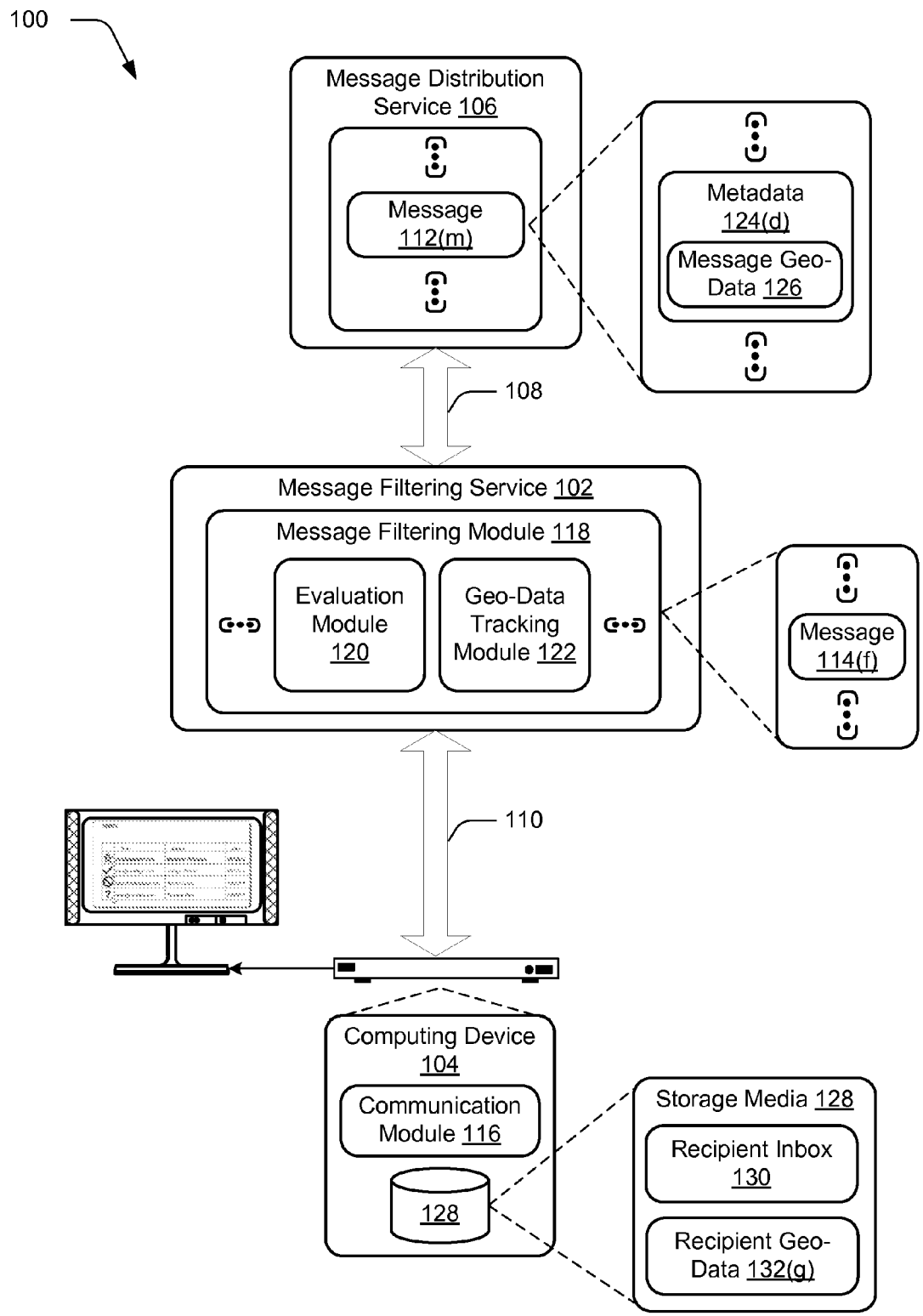
FIG. 1 is an illustration of an environment in an example implementation that is operable to employ geo-data spam filter techniques.

FIG. 1 is an illustration of an environment 100 in an example implementation that is operable to employ geo-data spam filter techniques described herein. The illustrated environment 100 includes a message filtering service 102, a computing device 104, and a message distribution service 106 that are communicatively coupled via network connections 108, 110. Although a single entity is shown, respectively for the message filtering service 102, the computing device 104, and the message distribution service 106 in FIG. 1, it should be readily apparent that each of these illustrated entities may also be implemented using a variety of different computing devices.

For example, the message filtering service 102, the computing device 104 and/or the message distribution service 106 may be configured as a computer that is capable of communicating over a network connection 110, such as a desktop computer, a mobile station, an entertainment appliance, a set-top box communicatively coupled to a display device, a wireless phone, a game console, and so forth. Thus, the message filtering service 102, the computing device 104 and/or the message distribution service 106 may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown for the message filtering service 102, the computing device 104 and the message distribution service 106, the computing device may be representative of a plurality of different devices, such as multiple servers utilized by a business to perform operations of the message distribution service 106, a remote control and set-top box combination, an image capture device and a game console configured to capture gestures, and so on.

The message filtering service 102, the computing device 104 and the message distribution service 106 may also include an entity (e.g., software) that causes hardware of the message filtering service 102, the computing device 104 and/or the message distribution service 106 to perform operations, e.g., processors, functional blocks, and so on. For example, the message filtering service 102, the computing device 104 and/or the message distribution service 106 may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via network connections 108, 110. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

The network connections 108, 110 may assume a wide variety of configurations. For example, the network connections 108, 110 may include a wide area network (WAN), a local area network (LAN), a wireless network, a public telephone network, an intranet, the Internet, and so on. Further, network connections 108, 110 may be configured to include multiple networks.

The message distribution service 106 includes one or more messages 112(m), where "m" can be any integer from 1 to "M". Messages 112(m) may take any of a variety of message formats, such as email, instant messages, short message service (SMS), voicemail, communications via a social network, and so on. The messages 112(m) are communicated from the message distribution service 106 to the message filtering service 102 over the network connection 108.

Messages 112(m) communicated via the network 108 are received by the message filtering service 102 and may be stored as one or more messages 114(f), where "f" may be any integer from 1 to "F". The messages 114(f) may be the same as or different from the messages 112(m) received from the message distribution service 106. The messages 114(f), for instance, may include additional data to filter the messages for delivery to the computing device 104, such as a score that indicates whether a particular message is likely to be spam.

The computing device 104 is illustrated as including a communication module 116. The communication module 116 is representative of functionality of the computing device 104 to communicate via network connection 110, such as with the message filtering service 102. Further, the communication module 116 is representative of functionality of the computing device 104 to send and receive messages. For example, the communication module 116 may be configured to send and receive email. Email employs standards and conventions for addressing and routing such that the email may be delivered across network connections 108, 110 utilizing a plurality of devices, such as routers, or other computing devices (e.g., email servers), and so on. In this way, emails may be transferred within a company over an intranet, across the world using the Internet, and so on. An email for instance, may include a header, text, and attachments, such as documents, computer-executable files, and so on. The header contains technical information about the source and oftentimes may describe the route the message took from the sender to the recipient.

In another example, the communication module 116 may be configured to send and receive instant messages. Instant messaging provides a mechanism such that a recipient, when participating in an instant messaging session, may send text messages to other entities using the computing device 104. The instant messages are typically communicated in real time, although delayed delivery may also be utilized, such as by logging the text messages when a recipient is unavailable, e.g., offline. Thus, instant messaging may be thought of as a combination of email and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

In yet another example, the communication module 116 represents functionality of the computing device 104 to communicate with the message filtering service 102 via network connection 110 in compliance with various other means for communicating messages, such as hypertext transfer protocol (HTTP). The communication module 116, for instance, may include functionality to receive and display messages 114(*f*) via a browser. For example, the computing device 104 typically includes hardware and software to display messages by the illustrated display device.

The message filtering service 102 is illustrated as including a message filtering module 118. The message filtering module 118 is representative of functionality to filter messages for delivery to respective recipients. For example, message filtering module 118 of message filtering service 102 filters messages 114(*f*) for delivery to computing device 104.

Message filtering module 118 may use a number of modules to filter messages for delivery. For example, the message filtering service 102 may include an evaluation module 120 and a geo-data tracking module 122 as shown. The evaluation module 120 is representative of functionality to evaluate data associated with each of the messages 114(*f*) and thereby establish a score for each message (e.g., a score indicating a likelihood that the message is spam). For example, the messages 112(*m*) provided by the message distribution service 106 may each include metadata 124(*d*), where "d" may be an integer between 1 and "D". In at least some implementations, the metadata 124(*d*) may include message geo-data 126, such as origin data and language data of the message. In this example, the evaluation module 120 may evaluate the message geo-data 126 to establish a score for each of the messages. Once the evaluation module 120 establishes a score for a particular message (e.g., a score indicating whether the message is likely to be spam), the message filtering module 118 may then filter the message for delivery. For example, if the established score of a message indicates that the message is likely to be spam, the message filtering module 118 may not have the message delivered, have the message deleted, have the message delivered to a junk folder of the recipient, or the like. If on the other hand, the established score indicates that the message is not likely to be spam, the message filtering module 118 may simply have the message delivered to a respective recipient's inbox.

The geo-data tracking module 122, which as previously stated may be included as part of the message filtering module 118, is representative of functionality to track interactions of message recipients with delivered messages. The tracked interactions may be used to form ranked lists that the evaluation module 120 can compare to the origin data and/or language data of a future message, and thereby establish a spam score for the message. For example, the geo-data tracking module 122 may track the interactions of a message recipient with messages 114(*f*) delivered to the computing device 104. In at least some implementations, the messages 114(*f*) may be delivered to computing device 104 and stored in storage media 128, such as in recipient inbox 130 of the storage media 128. A recipient of the messages 114(*f*) may then interact with the messages (e.g., by reading, replying to, deleting the messages, and so on).

The computing device 104 may record actions taken by the recipient with respect to a particular message. In addition, the computing device 104 may associate origin data and language data of a particular message with actions taken by the user to form recipient geo-data 132(*g*), where "g" may be an integer between 1 and "G". As illustrated, the recipient geo-data 132(*g*) may be stored in the storage media 128 of the computing device 104. In at least some implementations, the geo-data tracking module 122 may track the recipient geo-data 132(*g*) and use the recipient geo-data 132(*g*) to form ranked lists. For example, the geo-data tracking module may form ranked lists of message origins and languages with which the recipient interacts positively (e.g., origins with which the recipient typically reads, replies to, or archives messages), and ranked lists of message origins and languages with which the recipient interacts negatively (e.g., origins with which the recipient typically deletes, does not read, or moves messages to "junk" folders).

In another example, the geo-data tracking module 122 may track recipient geo-data 132(*g*) from multiple message recipients associated with multiple previously delivered messages to form aggregated ranked lists. For example, the geo-data tracking module 122 may form aggregated ranked lists of message origins and languages with which the multiple recipients interact positively and aggregated ranked lists of message origins and languages with which the multiple recipients interact negatively. In at least some embodiments, the evaluation module 120 can compare the origin data and/or language data of a message to the aggregated ranked lists. For example, the evaluation module 120 can compare a message's origin and/or language data to one such aggregated ranked list when a recipient does not have prior message interactions from which ranked lists of message origins and languages can be formed. In this way, aggregated ranked lists may be used as default ranked lists.

In yet another example, the geo-data tracking module 122 may track recipient geo-data 132(*g*) from multiple message recipients with respect to a single message. In some implementations, the message filtering module may have future communications of the message stopped, such as when the recipient interactions with the one message indicate that the message is likely to be spam. For example, a message may be delivered to multiple respective recipients who interact negatively with the message (e.g., delete the message without reading). In this example, the recipient geo-data 132(*g*) of the respective message recipients indicates the negative interactions with the message. Using the recipient geo-data 132(*g*) from the message recipients, the evaluation module 120 may establish a score for the message indicating that the message is likely to be spam. As a result, the message filtering service 102 may stop future communications of the message (or otherwise filter the message for delivery), because the score indicates that the message is likely to be spam. In this way, negative interactions from multiple recipients with respect to a single message may cause future communications of the message to be stopped.

In addition, the message filtering service 102 may filter copies of a message that have already been delivered when interactions from multiple recipients with the message indicate that the message is likely to be spam. For example, the message filtering service 102 may cause the already delivered message to be deleted from a respective recipient's inbox, or moved to a junk folder of a respective recipient.

It should be appreciated that a variety of different devices may be used to implement the functionality of the message filtering service 102 (e.g., to evaluate the origin data and language data of each of messages 114(*f*), establish a spam score for the respective message, and filter the messages 114(*f*) for delivery based on the score). Accordingly, the functionality represented by the evaluation module 120 and the geo-data tracking module 122 (as well as the message filtering module 118) may be distributed across these devices. As but one example, the functionality represented by the evaluation module 120 and the geo-data tracking module 122 (as well as the message filtering module 118) may be distributed across the message distribution service 106 and/or the computing device 104. Further discussion of the functionality represented by the message filtering service may be found in relation to the following figure.

Figure 2:
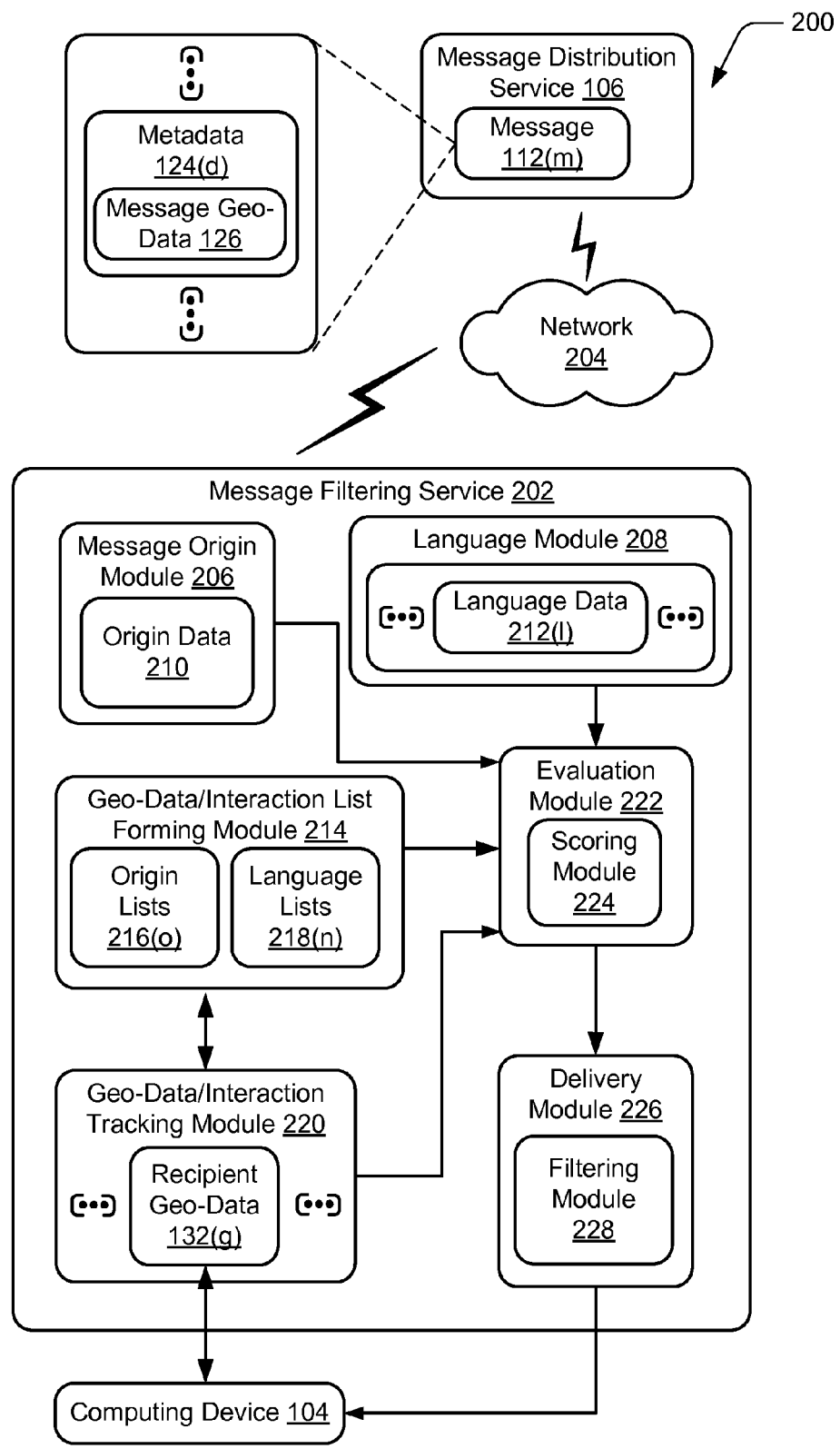
FIG. 2 is an illustration of an example system showing an email filtering service of FIG. 1 in greater detail as being in communication with an email distribution service and a computing device of FIG. 1.

FIG. 2 depicts an example system 200 showing the message filtering service 102 of FIG. 1 in greater detail as being in communication with the message distribution service 106 and the computing device 104 of FIG. 1 via one or more networks.

The message distribution service 106 as illustrated in FIG. 2 is communicatively coupled to message filtering service 202 and sends the messages 112(m) over a network e.g., via the network 204. The messages 112(m) in the illustrated implementation are communicated in accordance with one or more protocols, such as those described above in greater detail. The message filtering service 202 may use several modules to filter and establish a score for the messages 112(m), such as the collection of various modules in FIG. 2 that are illustrated as part of the message filtering service 202.

For instance, the score given to a particular message (e.g., the score indicating whether the message is likely to be spam), may be based on multiple characteristics. In at least some implementations, the score may be based on comparing origin data and language data of a message to ranked lists of message origins and languages. Accordingly, the message filtering service 202 may employ a message origin module 206 to extract/generate origin data for a message and a language module 208 to extract/generate origin data 210 and language data 212(1) (where "1" can be any integer between 1 and "L") for a message.

The message origin module 206, for instance, may determine a point of origin for a message, such as by determining an IP address of the message's sender (or by using the sender's domain, a "from" attribute, ASN, WHOIS, BGP, and so on). The message origin module 206 may then associate origin data 210 with the message and store corresponding data in metadata 124(d) of the message. The language module 208, on the other hand, may determine one or more languages that correspond to a particular message, such as a language in which the message is composed (or a language of the message's header). The language module 208 may then associate language data 212(1) with the message and store corresponding data in metadata 124(d) of the message. In one or more implementations, the origin data and/or the language data are not stored with the messages 112(m) as metadata 124(d).

The message filtering service 202 is illustrated as having a geo-data/interaction list forming module 214 to form ranked lists, such as ranked lists against which the origin data 210 and language data 212(1) of an incoming message can be compared. As discussed previously, a recipient's interactions with messages may be tracked (e.g., across numerous email messages). The tracked interactions can be subjected to statistical treatment to form lists that indicate how the recipient interacts with messages, such as how the recipient interacts with messages originating from particular countries (or interacts with messages that are composed in particular languages).

The geo-data/interaction list forming module 214 can track interactions to form various origin lists 216(o), where "o" can be any integer between 1 and "O". For example, the geo-data/interaction list forming module 214 can form ranked lists indicating message origins with which the recipient has positive message interactions, and/or ranked lists indicating message origins with which the recipient has negative message interactions. Similarly, the geo-data/interaction list forming module 214 can be used to form various language lists 218(n), where "n" can be any integer between 1 and "N". The language lists 218(n) may include, for instance, ranked lists indicating languages with which the recipient has positive message interactions, and/or ranked lists indicating languages with which the recipient has negative message interactions.

Further, the geo-data/interaction list forming module 214 may rank the origin lists 216(o) and the language lists 218(n) to help establish a score for a message that indicates whether the message is likely to be spam. For example, the lists may be ranked according to volumes, such as the number of interactions (e.g., positive or negative interactions) with messages received from a particular origin or in a particular language. In addition or alternatively, the lists may be ranked according to percentages, such as by a percentage of message interactions (e.g., positive or negative) from a particular origin or in a particular language.

A recipient, for example, may receive twenty (20) messages from country "X" and interact positively with ten (10) of those messages (e.g., reading the messages, replying to the messages, etc.). In this example, the recipient may also receive seven (7) messages from country "Y" and interact positively with all seven (7) of those messages. Further, the geo-data/interaction list forming module 214 can form a ranked list that indicates positive interactions with various message origins that is ranked according to volume. In this example, the geo-data/interaction list forming module 214 could rank country "X" ahead of country "Y" because the recipient had ten (10) positive interactions with messages from country "X" and seven (7) positive interactions with messages from country "Y". In addition or alternatively, geo-data/interaction list forming module 214 can form a ranked list that indicates positive interactions with various message origins that is ranked according to a percentage of positive interactions with the messages received. In this example, the geo-data/interaction list forming module 214 could rank country "Y" ahead of country "X" because the recipient had positive interactions with one-hundred percent (100%) of the messages from country "Y" and positive interactions with only fifty-percent (50%) of the messages from country "X".

To form the ranked lists, the geo-data/interaction list forming module 214 may use the interactions of multiple message recipients with multiple messages. The message filtering service is illustrated as including a geo-data/interaction tracking module 220 to track recipient interactions with delivered messages. For example, the geo-data/interaction tracking module 220 may collect recipient geo-data 132(g) from computing devices as described above in. The geo-data/interaction tracking module 220 may then use the data collected from the computing devices to track the interactions of the multiple respective message recipients with the messages delivered to the recipients. The geo-data/interaction tracking module 220, can be communicatively coupled to the geo-data/interaction list forming module 214, and thereby communicate the tracked recipient interactions to the geo-data/interaction list forming module 214. The geo-data/interaction list forming module 214 can then use the tracked interactions to form the ranked lists (e.g., origin lists 216(o) and/or language lists 218(n)).

The message filtering service 202 is also illustrated as including an evaluation module 222 and a scoring module 224, which are representative of functionality to evaluate origin data and language data of a message to establish a score for the message that indicates a likelihood that the message is spam. The evaluation module 222, for instance, may determine to use origin data 210 and language data 212(1) of the message to establish the spam score for the message. The origin data 210 and the language data 212(1) of the message may be chosen from a number of factors that can be used to establish a spam score for a message. In at least some implementations, the evaluation module 222 may determine to use the origin data 210 and language data 212(1) exclusively, or along with other factors to establish the spam score for the message.

The evaluation module 222 is also representative of functionality to receive origin data 210 and language data 212(1) of a message from the message origin module 206 and the language module 208 respectively. With this data, the evaluation module 222 can compare the origin data 210 and the language data 212(1) of the message to origin lists 216(o) and language lists 218(n) from the geo-data/interaction list forming module 214 (e.g., ranked lists associated with the message's respective recipient or aggregated from multiple recipients).

In another example, the evaluation module 222 can compare the origin data 210 and the language data 212(1) of a message addressed to multiple recipients to the ranked lists of those recipients.

The scoring module 224 is representative of functionality to establish a score for an incoming message that indicates whether the message is likely to be spam. For example, the scoring module may establish a score for a message indicating that the message is likely to be spam, such as when an evaluation of the a message's origin data and/or the language data reveals that the origin data and/or the language data correspond to a message origin or language with which the recipient interacts negatively (or correspond to a message origin or language with which the recipient has not yet interacted). In addition or alternatively, the scoring module 224 may establish a score for a message addressed to multiple recipients indicating that the message is likely to be spam when the message origin data and/or language data correspond to a message origin or language with which the multiple recipients generally interact negatively (or do not generally interact).

In some implementations, the scoring module may establish a score for the message indicating that the message is not likely to be spam even though the origin data and/or language data correspond to a message origin or language with which the recipient interacts negatively. For example, the evaluation module 222 may determine to evaluate factors in addition to origin data and language data to determine whether a message is likely to be spam. In this example, the scoring module 224 may establish a score indicating that the message is not likely to be spam when those other factors indicate that the recipient may interact positively with the message (e.g., when those other factors outweigh the origin data and the language data).

Once a spam score is established for a message, the message can be filtered for delivery based on the score. Message filtering service 202 is illustrated as including a delivery module 226 and a filtering module 228 which are representative of functionality to filter and deliver messages to message recipients. For example, the filtering module 228 may direct the delivery module 226 not to deliver a message having a score that indicates that the message is likely to be spam. In one or more implementations, the filtering module 228 may have the message deleted, direct the delivery module 226 to deliver the message to a junk folder of the recipient, and so on. In addition, the filtering module 228 can direct the delivery module 226 to deliver a message to an inbox of a recipient (e.g., recipient inbox 130 on computing device 104), such as when the score for the message indicates that the message is not likely to be spam.

In another example, the filtering module 228 can direct the delivery module 226 to stop future communications of a message, such as when multiple recipients that have already received the message interact negatively with the message. For example, geo-data/interaction tracking module 220 may track multiple negative interactions of multiple recipients with a particular delivered message. Consequently, the evaluation module 222 and the scoring module 224 can update the score of the message to indicate that recipients are typically interacting negatively with the message, such as by updating the score to indicate that the message is likely to be spam. Then, the filtering module 228 can direct the delivery module 226 to filter (e.g., not deliver) the message to recipients that have not yet received the message based on the updated score.

In yet another example, the filtering module 228 can direct the delivery module 226 to stop future communications of messages from a particular origin or in a particular language based on different previously delivered messages. For example, the filtering module 228 may direct the delivery module 226 not to deliver incoming messages with particular origin data, such as messages that originate from an IP address or country that is known to be an origin of spam. Likewise, the filtering module 228 may direct the delivery module 226 not to deliver incoming messages with particular language data, such as when the recipient (or group of recipients) has interacted negatively with previous messages in the particular language and has not interacted positively with previous messages in the language.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Example Procedures

The following discussion describes geo-data spam filter techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
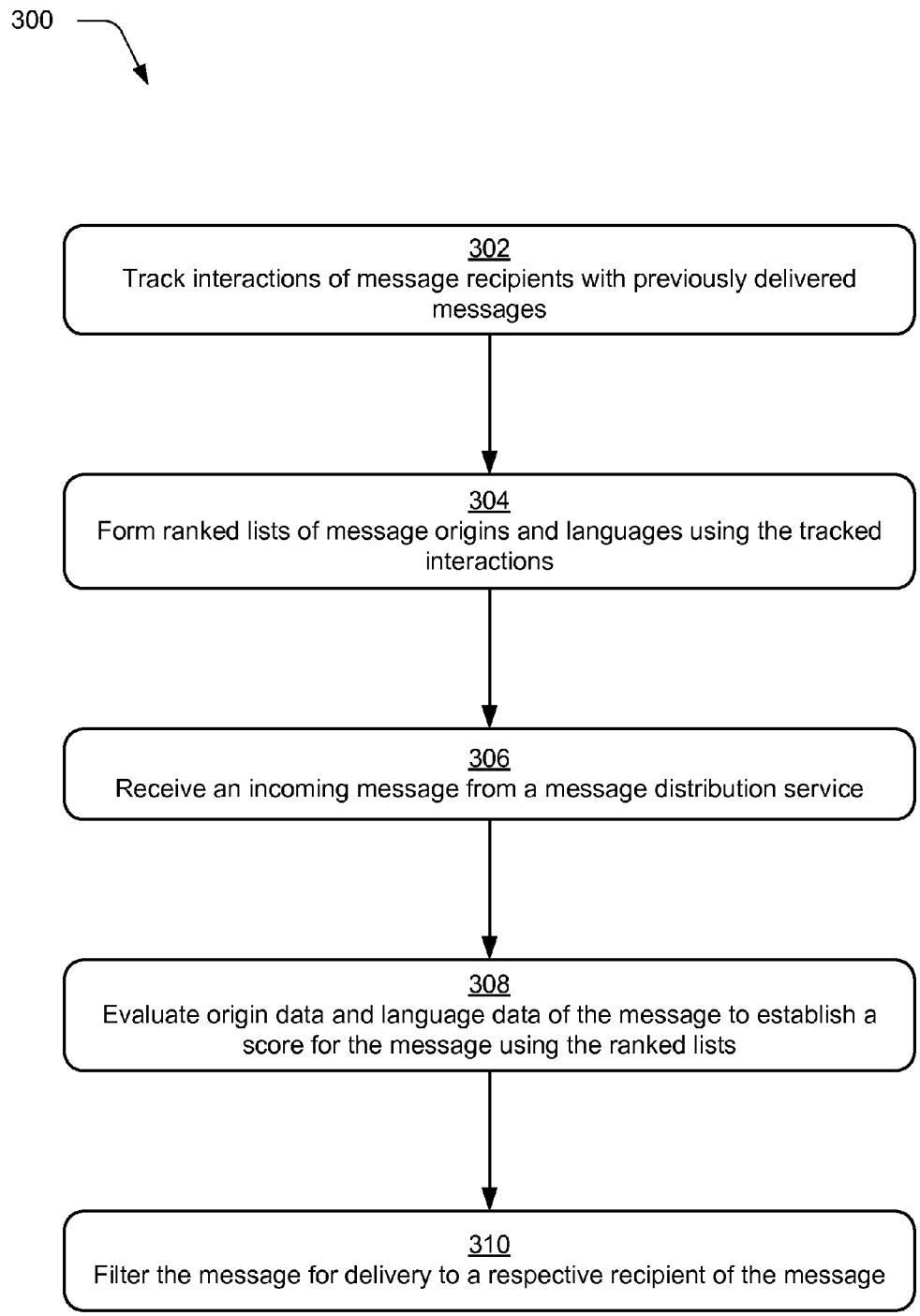
FIG. 3 is a flow diagram depicting a procedure in an example implementation in which origin data and language data of a message is evaluated to filter the message for delivery to a respective recipient by a message filtering service.

FIG. 3 depicts a procedure in an example implementation in which origin data and language data of a message are evaluated to filter the message for delivery to a respective recipient by a message filtering service 202. Interactions of multiple message recipients with messages delivered prior to a current message are tracked (block 302). For example, message filtering service 202 may deliver prior messages to a recipient, such as a recipient using computing device 104. The message filtering service 202, such as by leveraging the functionality of the geo-data/interaction tracking module 220, may track the interactions of the recipient with each of the prior messages. Further, the recipient's interaction(s) with a particular message (e.g., read, reply to, delete, etc.) may tracked along with origin data and/or language data of the message, and stored as recipient geo-data 132(g).

The tracked interactions can be used to form ranked lists of message origins and languages (block 304). The geo-data/interaction list forming module 214, for instance, may use recipient geo-data 132(g) to form origin lists 216(o) and language lists 218(n), such as ranked lists indicating message origins and languages with which the recipient interacts positively (and lists indicating message origins and languages with which the recipient interacts negatively). In another example, the tracked interactions from multiple recipients can be used to form aggregated ranked lists. These aggregated ranked lists may be used by the evaluation module 222 as default lists, such as when a recipient does not have prior message interactions.

An incoming current message is received from a message distribution service (block 306), such as when message filtering service 202 receives messages 112(m) from the message distribution service 106 over network 204. After receiving a message, languages that correspond to the message can be determined, such as by the language module 208 of the message filtering service 202. As discussed in more detail above, the language module 208 can extract/generate language data 212(1) for an incoming message. Additionally, an origin of a message (e.g., a respective sender's IP address) can be determined, such as by the message origin module 206 of the message filtering service 202. As discussed in more detail above, the message origin module can extract/generate origin data 210 for the message.

Upon receipt of a message, the origin data and language data of the message is evaluated, using the ranked lists, to establish a score for the message (block 308). The evaluation module 222, for instance, may compare origin data 210 and language data 212(1) from messages 112(m) to the origin lists 216(o) and language lists 218(n) to establish a score for each of the messages that indicates whether the message is likely to be spam.

Furthermore, the evaluation module 222 may determine to use origin data and language data of incoming messages in addition to other factors (or to the exclusion of other factors) to establish spam scores for the messages. In this way, the score established by the scoring module 224 may indicate that a message is not likely to be spam, although the origin data and/or the language data of the message correspond to a message origin or language with which the recipient interacts negatively. For example, when the evaluation module 222 determines to use the origin data and language data (which correspond to an origin and/or language with which the recipient interacts negatively), as well as other factors (which indicate that the message is not likely to be spam), and the other factors outweigh the origin data and language data, the scoring module 224 may establish the spam score to indicate that the message is not likely to be spam.

After the score of a message is established, the message is filtered for delivery to a respective recipient of the message (block 310). For example, when the scoring module 224 establishes a score for a message indicating that the message is likely to be spam, the filtering module 228 can direct the delivery module 226 not to deliver the message to the message recipient. Similarly, the filtering module 228 may direct the delivery module 226 to delete the message or to deliver the message to a junk message folder of the recipient. However, when the scoring module 224 establishes a score for a message indicating that the message is not likely to be spam, the filtering module 228 can direct the delivery module 226 to deliver the message to the respective recipient's inbox, such as recipient inbox 130 of computing device 104.

Figure 4:
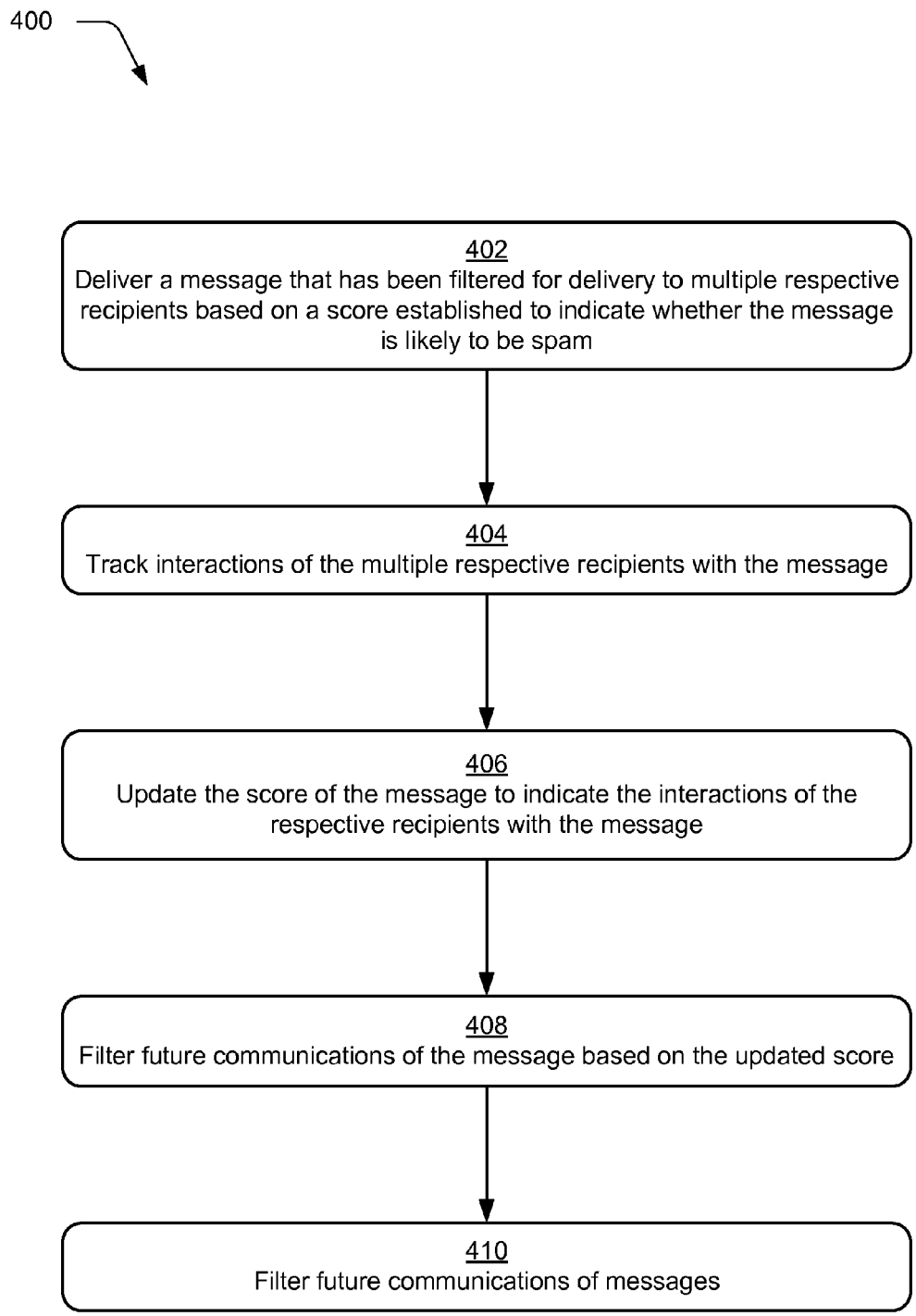
FIG. 4 is a flow diagram depicting a procedure in an example implementation in which future communications of a message are filtered based on interactions of message recipients who have already received the message.

FIG. 4 depicts a procedure in an example implementation in which future communications of a message are filtered by a message filtering service 202 based on interactions of message recipients who have already received the message. In one or more implementations, a message that has been filtered for delivery to multiple respective recipients is delivered based on a score established to indicate whether the message is likely to be spam (block 402). For example, message filtering service 202, such as by leveraging the functionality of the evaluation 222 and scoring module 224, evaluates a message to establish a score for the message indicating whether the message is likely to be spam. Then, prior to delivery of the message, the message filtering service 202, such as by leveraging the functionality of the filtering module 228, filters the message for delivery based on the score. The delivery module 226 may then deliver the filtered message to one or more respective recipients of the message.

The interactions of the multiple respective recipients with the delivered message are tracked (block 404). For example, geo-data/interaction tracking module 220 tracks interactions of the recipients with the message (e.g., read, reply to, delete, etc.), such as by using recipient geo-data 132(g) from the multiple recipients.

Once the interactions of recipients having received the message are tracked, the score of the message is updated to indicate the interactions of the respective recipients with the message (block 406). For example, a message may be delivered to multiple recipients because the score initially established for the message indicates that the message is not likely to be spam. However, the tracked interactions of the recipients with the message may be generally negative. As described in more detail above, these interactions may be tracked by the geo-data/interaction tracking module 220. Using the tracked interactions, the score of the message may be updated to reflect the negative interactions by the recipients, for instance, by the evaluation module 222 and the scoring module 224 to indicate that the message is likely to be spam.

After the score for a message is updated to reflect the interactions of recipients that have already received the message, future communications of the message can be filtered based on the updated score of the message (block 408). In the example discussed just above, for instance, the filtering module 228 can direct the delivery module 226 not to deliver future communications of the message when the updated score indicates that the message is likely to be spam. Likewise, the filtering module 228 can direct the delivery module 226 to delete future communications of the message, or send the message directly to a junk folder of the recipient.

In some implementations, the filtering module 228 may filter already delivered copies of a message, the score of which has been updated to reflect the interactions of recipients who have received the message. For example, the filtering module 228 may cause the already delivered copies of the message to be deleted from respective recipients' inboxes, or moved to junk folders of the respective recipients.

Additionally, future communication of messages can be filtered (block 410). For example, the interactions of recipients with a previously sent message having particular origin data and language data may be tracked. As described above, a score for the message may be updated to indicate, for instance, that the message is likely to be spam. In the future, different messages that have the same origin data and/or language data as the previously sent message may be received by the message filtering service 202. The message filtering service 202 may filter these different messages for delivery, such as by utilizing the functionality of the delivery module 226 and the filtering module 228 to stop delivery of the different messages.

Further, these further communications may be filtered by assigning a negative spam score to a sender of the email. Thus, in this instance, the spam score assigned to the sender may be used to filter regardless of the origin or language data. Other implementations are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method, comprising:
   executing a message filtering service by a hardware processor of a computing device to perform:
   tracking interactions of a recipient with delivered messages to form ranked lists of message origins with which the recipient interacts negatively, the interactions used in part to establish a score for subsequent messages from a same origin;
   evaluating origin data of a received message using the ranked lists to associate the score with the received message, the score indicating a likelihood the received message is spam;
   delivering the received message to a message inbox on a user device of the recipient;
   tracking interactions of multiple message recipients with the received message after said delivering the received message to the recipient to update the score indicating the likelihood the received message is spam; and
   deleting the received message from the message inbox of the recipient based on the updated score that is associated with the received message.

2. The method as recited in claim 1, further comprising stopping delivery of the subsequent messages based on the recipient interacting negatively with the received message.

3. The method as recited in claim 1, further comprising filtering a subsequent message based on the updated score.

4. The method as recited in claim 3, wherein the filtering includes one of not delivering the subsequent message, deleting the subsequent message, or delivering the subsequent message to a junk folder of the recipient.

5. The method as recited in claim 1, further comprising not delivering the received message to another recipient based on the updated score.

6. The method as recited in claim 1, wherein said evaluating the origin data includes evaluating an IP address that is associated with a country of the origin of the received message, and whether the recipient interacts with the country.

7. The method as recited in claim 1, wherein said evaluating the origin data includes evaluating a language that is associated with a country of the origin of the received message, and whether the recipient interacts with the country.

8. The method as recited in claim 1, further comprising updating the score for the subsequent messages based on said tracking the interactions of the recipient, the interactions including the recipient one or more of deleting the received message, not selecting the received message, and moving the received message to a junk folder.

9. The method as recited in claim 1, wherein the interactions of a respective message recipient of the multiple message recipients include one or more of deleting the received message, not selecting the received message, and moving the received message to a junk folder.

10. A system, comprising:
    a memory configured to maintain a message that is received for a recipient and prior to delivery of the message to the recipient;
    a hardware processor system to implement a message filtering service that is configured to:
    track interactions of the recipient with delivered messages to form ranked lists of message origins with which the recipient interacts negatively, the interactions used in part to establish a score for subsequent messages from a same origin;
    evaluate origin data of the received message using the ranked lists to associate the score with the received message, the score indicating a likelihood the received message is spam;
    deliver the received message to a message inbox on a user device of the recipient;
    track recipient geo-data of multiple message recipients stored at respective computing devices of the message recipients indicating interactions of the multiple message recipients with the received message after the received message is delivered to the recipient to update the score for the message indicating the likelihood the received message is spam; and
    delete the received message from the message inbox of the recipient based on the updated score that is associated with the received message.

11. The system as recited in claim 10, wherein the message filtering service is configured to stop delivery of the subsequent messages based on the recipient interacting negatively with the received message.

12. The system as recited in claim 10, wherein the message filtering service is configured to filter a subsequent message based on the updated score.

13. The system as recited in claim 12, wherein the message filtering service is configured to filter the message by one of not delivering the subsequent message, delete the subsequent message, or deliver the subsequent message to a junk folder of the recipient.

14. The system as recited in claim 10, wherein the message filtering service is configured to take an action to filter the received message based on the updated score.

15. The system as recited in claim 14, wherein the message filtering service is configured to said evaluate the origin data of the received message including to evaluate a language that is associated with the country of the origin of the received message.

16. The system as recited in claim 10, wherein the message filtering service is configured to said evaluate the origin data of the received message including to evaluate an IP address that is associated with a country of the origin of the received message.

17. The system as recited in claim 10, wherein the message filtering service is configured to update the score for the subsequent messages based on the tracked interactions of the recipient, the interactions including the recipient one or more of deleting the received message, not selecting the received message, and moving the received message to a junk folder.

18. A computer-readable storage memory comprising computer-executable instructions that when executed by a computing device, direct the computing device to:
    track interactions of a recipient with delivered messages to form ranked lists of message origins with which the recipient interacts negatively, the interactions used in part to establish a score for subsequent messages from a same origin;
    receive a message for delivery to the recipient;
    evaluate origin data of the received message using the ranked lists to associate the score with the received message, the score indicating a likelihood the received message is spam;
    deliver the received message to a message inbox on a user device of the recipient;
    track interactions of multiple message recipients with the received message after said delivery of the received message to the recipient to update the score for the received message indicating a likelihood the received message is spam; and delete the received message from the message inbox of the recipient based on the updated score that is associated with the received message.

19. The computer-readable storage memory as recited in claim 18, wherein the instructions further direct the computing device to take the action to filter a subsequent message by one of not delivering the subsequent message, deleting the subsequent message, or delivering the subsequent message to a junk folder of the recipient.

20. The computer-readable storage memory as recited in claim 18, wherein the interactions of a respective message recipient of the multiple message recipients include one or more of deleting the received message, not selecting the received message, and moving the received message to a junk folder.

\* \* \* \* \*